United States Patent [19]
Hinoki et al.

[11] Patent Number: 6,126,990
[45] Date of Patent: Oct. 3, 2000

[54] METHOD FOR PRODUCING MAGNETIC RECORDING MEDIUM

[75] Inventors: Kiyonori Hinoki; Kiyoto Fukushima, both of Nagano, Japan

[73] Assignee: TDK Corporation, Tokyo, Japan

[21] Appl. No.: 09/040,438

[22] Filed: Mar. 18, 1998

[51] Int. Cl.$^7$ ....................................................... B05D 5/12
[52] U.S. Cl. ........................... 427/131; 427/130; 427/132
[58] Field of Search ....................................... 427/127–132

[56] References Cited

FOREIGN PATENT DOCUMENTS

| | | |
|---|---|---|
| 54-161910 | 12/1979 | Germany . |
| 49-055303 | 5/1974 | Japan . |
| 51-041801 | 11/1976 | Japan . |
| 51-149007 | 12/1976 | Japan . |
| 52-011207 | 3/1977 | Japan . |
| 55-028129 | 7/1980 | Japan . |
| 57-046326 | 3/1982 | Japan . |
| 33 22 746 | 1/1985 | Japan . |
| 60-050725 | 3/1985 | Japan . |
| 60-050727 | 3/1985 | Japan . |
| 60-089823 | 5/1985 | Japan . |
| 63-251923 | 10/1988 | Japan . |
| 63-271717 | 11/1988 | Japan . |
| 2-223012 | 9/1990 | Japan . |
| 4-184903 | 11/1990 | Japan . |
| 3-069013 | 3/1991 | Japan . |
| 3-086917 | 4/1991 | Japan . |
| 3-157811 | 7/1991 | Japan . |
| 4-134721 | 5/1992 | Japan . |
| 6-176346 | 6/1994 | Japan . |
| 6-208719 | 7/1994 | Japan . |
| 7-046418 | 5/1995 | Japan . |
| 1 232 337 | 5/1971 | United Kingdom . |

*Primary Examiner*—Bernard Pianalto
*Attorney, Agent, or Firm*—Oblon, Spivak, McClelland, Maier & Neustadt, P.C.

[57] ABSTRACT

A method for producing a magnetic recording medium having low head abrasion loss and excellent mechanical strength characteristics, said medium having a magnetic layer mainly composed of a ferromagnetic powder and a binder on one surface of a non-magnetic support and a backcoat layer on the other surface of the support, wherein said ferromagnetic powder comprises chromium dioxide and cobalt-containing iron oxide within the weight ratio (wt %) range of 40:60 to 70:30, and said magnetic layer is formed of a paint prepared by a process comprising kneading cobalt-containing iron oxide and the binder at a solid concentration of 65% to 85% by weight, subsequently diluting the resulting product with the binder and a solvent, then, adding chromium dioxide thereto, followed by stirring to obtain a mixture, and subjecting the mixture to dispersion.

2 Claims, No Drawings

METHOD FOR PRODUCING MAGNETIC RECORDING MEDIUM

FIELD OF THE INVENTION

The present invention relates to a method for producing a magnetic recording medium comprising a magnetic layer having cobalt-containing iron oxide and chromium dioxide as a ferromagnetic powder.

BACKGROUND OF THE INVENTION

Magnetic recording media for VTRs integrated with cameras, particularly for the VHS-C system, have a recording time limit of 30 minutes in the normal mode. In recent year, there are growing expectations for magnetic recording media recordable for a longer period of time. In order to prolong the recording time, it is necessary to make magnetic recording media thinner. In this case, however, the problem is that the mechanical strength characteristics of the media are deteriorated, resulting in tape folding or breakage under repeated running. For solving this problem, some proposals have been made to add chromium dioxide to magnetic layers, thereby improving the mechanical strength characteristics of the media.

That is to say, (1) blending of chromium dioxide in an amount of less than 40% by weight based on the total amount of ferromagnetic powder is proposed in Japanese Examined Patent Publication No. 55-28129, Japanese Examined Patent Publication No. 52-11207, Japanese Examined Patent Publication No. 7-46418, Japanese Unexamined Patent Publication No. 51-149007, Japanese Unexamined Patent Publication No. 57-46326, Japanese Unexamined Patent Publication No. 3-86917 and Japanese Unexamined Patent Publication No. 4-134721, (2) blending of chromium dioxide in an amount of more than 70% by weight based on the total amount of ferromagnetic powder is proposed in Japanese Unexamined Patent Publication No. 49-55303, Japanese Unexamined Patent Publication No. 2-223012, Japanese Unexamined Patent Publication No. 6-176346 and Japanese Unexamined Patent Publication No. 6-208719, (3) blending of chromium dioxide in an amount of 40% to 70% by weight based on the total amount of ferromagnetic powder is proposed in Japanese Examined Patent Publication No. 51-41801, Japanese Unexamined Patent Publication No. 54-161910, Japanese Unexamined Patent Publication No. 60-50727 and Japanese Unexamined Patent Publication No. 60-89823, and (4) the specific amount of chromium dioxide added is not particularly described in Japanese Unexamined Patent Publication No. 60-50725, Japanese Unexamined Patent Publication No. 63-251923, Japanese Unexamined Patent Publication No. 63-271717, Japanese Unexamined Patent Publication No. 3-69013 and Japanese Unexamined Patent Publication No. 3-157811.

In the method of (1) described above, however, the amount of chromium dioxide is less than 40% by weight based on the total amount of ferromagnetic powder, so that sufficient mechanical strength characteristics (dynamic buckling strength) can not be obtained in tapes for long recording (particularly, 40 minutes in the normal mode of the VHS-C system) to raise the problem of occurrence of tape damage. Further, in the method of (2) described above, the amount of chromium dioxide is more than 70% by weight based on the total amount of ferromagnetic powder, which causes an increase in head abrasion loss. Furthermore, in (1) to (4) described above, all methods for preparing paints for magnetic layers are not studied considering the filling properties of the magnetic layers, and measures to obtain the sufficient mechanical strength characteristics in tapes for long recording are not sufficient.

SUMMARY OF THE INVENTION

It is therefore an object of the invention to provide a method for producing a magnetic recording medium comprising chromium dioxide and cobalt-containing iron oxide, wherein said magnetic recording medium has a low friction coefficient and the sufficient mechanical strength characteristics by improving the filling properties of the magnetic layer.

In order to solve the above-mentioned problem, the present inventors have conducted intensive investigation. As a result, the present inventors have discovered that the above-mentioned problem can be solved by forming a magnetic layer of a paint which is prepared by kneading and mixing a ferromagnetic powder containing specific amounts of chromium dioxide and cobalt-containing iron oxide by a specific method, thus completing the present invention.

That is to say, according to the present invention, there is provided a method for producing a magnetic recording medium having a non-magnetic support, a magnetic layer mainly composed of a ferromagnetic powder and a binder on one surface of said support and a backcoat layer on the other surface of said support, wherein said ferromagnetic powder comprises chromium dioxide and cobalt-containing iron oxide within the weight ratio (wt %) range of 40:60 to 70:30, and said magnetic layer is formed of a paint prepared by kneading cobalt-containing iron oxide and the binder at a solid concentration of 65% to 85% by weight, subsequently diluting the resulting product with the binder and a solvent, then, adding chromium dioxide thereto, followed by stirring to obtain a mixture, and subjecting the mixture to dispersion.

DESCRIPTION OF THE PREFERRED EMBODIMENTS

The present invention is hereinafter described in more detail.

The ferromagnetic paints for forming the magnetic layers and paints for forming the backcoat layers used in the present invention are described.

Compounded Components of Paints for Forming Magnetic Layers

In the present invention, cobalt-containing iron oxide and chromium dioxide are used in combination as the ferromagnetic powders. As to cobalt-containing iron oxide, it is particularly preferred to use Co—$\gamma$—$Fe_2O_3$ or Co—$Fe_3O_4$ of the cobalt coating (or adsorbed) type, or intermediate oxides thereof. There is no particular limitation on the shape thereof. However, the acicular form is more preferred because the longitudinal mechanical strength characteristics can be enhanced by magnetic orientation. The average major axis is preferably 0.05 $\mu$m to 0.8 $\mu$m, and the average axial ratio is preferably 1 to 15. A longer average major axis or a lower average axial ratio roughens surfaces of the magnetic layers to increase head abrasion. On the other hand, a shorter average major axis or a higher average axial ratio lowers the dispersibility of the paints to deteriorate the mechanical strength characteristics. The specific surface area (BET value) is preferably 20 $m^2/g$ to 45 $m^2/g$. A specific surface area of less than 20 $m^2/g$ roughens surfaces of the magnetic layers to increase head abrasion, whereas exceeding 45 $m^2/g$ lowers the dispersibility of the paints to deteriorate the mechanical strength characteristics.

Chromium dioxide is preferably contained in an amount of 40% to 70% by weight based on the total amount of ferromagnetic powder. Less than 40% by weight can not provide the sufficient mechanical strength characteristics, whereas exceeding 70% by weight causes an increase in head abrasion. For the same reason as with cobalt-containing iron dioxide, there is no particular limitation on the shape thereof. In the acicular form advantageous for the mechanical strength characteristics, the average major axis, the average axial ratio and the BET value are preferably 0.1 $\mu$m to 1.0 $\mu$m, 2 to 20, and 20 $m^2$/g to 30 $m^2$/g, respectively.

The binders may be any of thermoplastic resins, thermosetting resins, reactive resins, electron beam irradiation curing resins and mixtures thereof.

Examples of the above-mentioned thermoplastic resins include vinyl chloride-acrylic ester copolymers, vinyl chloride-vinyl acetate copolymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-ethylene copolymers, polyvinyl fluoride-vinylidene chloride-acrylonitrile copolymers, acrylonitrile-butadiene copolymers, polyamide resins, polyvinyl butyral, cellulose derivatives (for example, cellulose acetate butyrate, cellulose diacetate, cellulose triacetate, cellulose propionate and nitrocellulose), styrene-butadiene copolymers, polyester resins, polyurethane resins, chlorovinyl ether-acrylic ester copolymers, amino resins, and synthetic rubber thermoplastic resins. They may be used alone or in combination.

Examples of the above-mentioned thermosetting resins and reactive resins include phenolic resins, epoxy resins, polyurethane curing resins, urea resins, melamine resins, alkyd resins, silicone resins, acrylic reactive resins, mixtures of high polymeric polyester resins and isocyanate prepolymers, mixtures of methacrylate copolymers and diisocyanate prepolymers, urea-formaldehyde resins and polyamine resins. They may be used alone or in combination.

As the binders, the electron beam irradiation curing resins are also preferably used. Examples thereof include unsaturated prepolymers of a maleic anhydride type, an urethane acrylic type, an epoxy acrylic type, a polyester acrylic type, a polyether acrylic type, a polyurethane acrylic type and a polyamide acrylic type; and multifunctional monomers of an ether acrylic type, an urethane acrylic type, an epoxy acrylic type, a phosphoric ester acrylic type, an aryl type and a hydrocarbon type. They may be used alone or in combination.

Of these, the use of the vinyl chloride copolymers and the polyurethane resins in combination is preferred.

It is preferred that the vinyl chloride copolymers have a vinyl chloride content of 60% to 100% by weight, particularly 70% to 95% by weight. Such vinyl chloride copolymers include vinyl chloride-vinyl acetate-vinyl alcohol copolymers, vinyl chloride-vinyl alcohol copolymers, vinyl chloride-hydroxyalkyl (meth)acrylate copolymers and vinyl chloride-vinyl acetate-vinyl alcohol-glycidyl (meth)acrylate copolymers. In particular, a copolymer of vinyl chloride with one kind of vinyl acetate, vinyl alcohol, an epoxy group-containing monomer, an acidic polar group-containing monomer and an amine-modified vinyl group-containing monomer, or with two or more kinds thereof is preferred.

Preferred examples of the acidic polar groups include —$OPO_2Y$, —$PO_3Y$ and —COOY groups, as well as sulfur-containing polar groups. Sulfuric acid groups and/or sulfo groups are particularly preferred. In the sulfuric acid group and the sulfo group represented by —$SO_4Y$ and —$SO_3Y$, respectively, Y may be either H or an alkali metal. However, it is further preferred that Y is K, namely, these groups are —$SO_4K$ and —$SO_3K$, respectively.

Either or both of the sulfuric acid group and the sulfo group may be contained. When both are contained, the ratio thereof is arbitrary. In addition, these sulfur-containing polar groups are contained in molecules preferably in an amount of 0.01% to 10% by weight, and more preferably in an amount of 0.1% to 5% by weight, as sulfur atoms.

The average polymerization degree is preferably from 100 to 900, and more preferably from 200 to 500. Less than 200 causes deterioration in running durability, whereas exceeding 500 results in lowered dispersibility of the paints to deteriorate the mechanical strength characteristics.

The polyurethane resins are generally obtained by the reaction of hydroxyl group-containing resins with polyisocyanate-containing compounds.

The hydroxyl group-containing resins include polyalkylene glycols such as polyethylene glycol, polybutylene glycol and polypropylene glycol; alkylene oxide adducts such as bisphenol A; and polyester polyols having various glycols and hydroxyl groups at the terminals of molecular chains. Of these, a polyurethane acrylate resin obtained using the polyester polyol as one component is preferred. Carboxylic acid components of the polyester polyols include aromatic dicarboxylic acids such as terephthalic acid, isophthalic acid, orthophthalic acid and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid and dodecanedicarboxylic acid; unsaturated aliphatic acids and alicyclic dicarboxylic acids such as fumaric acid, maleic acid, itaconic acid, tetrahydrophthalic acid and hexahydrophthalic acid; and tricarboxylic and tetracarboxylic acids such as trimellitic acid, trimesic acid and pyromellitic acid. Further, glycol components of the polyester polyols include ethylene oxide adducts and propylene oxide adducts of ethylene glycol, propylene glycol, 1,3-propanediol, 1,4-butanediol, 1,5-pentanediol, 1,6-hexanediol, neopentyl glycol, diethylene glycol, dipropyleneglycol, 2,2,4-trimethyl-1,3-pentanediol, 1,4-cyclohexanedimethanol and bisphenol A, ethylene oxide adducts and propylene oxide adducts of hydrogenated bisphenol A, polyethylene glycol, polypropylene glycol and polytetramethylene glycol. In addition, triols and tetraols such as trimethylolmethane, trimethylolpropane, glycerin and pentaerythritol may be used in combination with these glycols. Besides, the polyester polyols further include lactone type polyester diol chains obtained by ring-opening polymerization of lactones such as caprolactone.

The polyisocyanates include diisocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4, 4'-biphenylene diisocyanate, 4,4'-diphenylene diisocyanate, 4,4'-diisocyanatodiphenyl ether, 1,5'-naphthalene diisocyanate, p-xylylene diisocyanate, m-xylylene diisocyanate, 1,3-diisocyanatomethylcyclohexane, 1,4-diisocyanatomethylcyclohexane, 4,4'-diisocyanatodicyclohexane, 4,4'-diisocyanatocyclohexylmethane and isophorone diisocyanate, and triisocyanate compounds such as a trimer of 2,4-tolylene diisocyanate not exceeding 7 mol % of the entire isocyanate groups.

Such polyurethane resins are obtained by reacting raw materials containing specific polar group-containing compounds and/or starting material resins which have been reacted with the specific polar group-containing compounds, in solvents or without solvents by known methods.

The polyurethane resins contain sulfur- or phosphorus-containing polar groups. One or more kinds of —$SO_3Y$ (sulfonic acid group) and —$SO_4Y$ (sulfuric acid group) are preferably used as the sulfur-containing polar groups, and —$PO_3Y$ (phosphonic acid group), —$PO_2Y$ (phosphinic acid group) and —POY (phosphonous acid group) as the phosphorus-containing polar groups, wherein Y is particularly preferably Na and these polar groups are preferably contained in molecules in an amount of 0.01% to 10% by weight and particularly 0.02% to 3% by weight as atoms. These may be present in main chains or branched chains of skeleton resins.

The molecular weight is desirably from 5,000 to 100,000. Less than 5,000 causes deterioration in running durability, whereas exceeding 100,000 results in lowered dispersibility of the resulting paints to deteriorate the mechanical strength properties.

The binders are preferably used in which the vinyl chloride resins are mixed with the polyurethane resins at a mixing ratio by weight of the vinyl chloride resins to the polyurethane resins of 30:70 to 80:20.

The content of the binder is preferably 5 parts to 40 parts by weight, and more preferably 10 parts to 30 parts by weight, per 100 parts by weight of magnetic powder. Less than 10 parts by weight causes deterioration in running durability, whereas exceeding 30 parts by weight results in lowered electromagnetic characteristics.

A variety of polyisocyanates and diisocyanates can be used as crosslinking agents for curing the binders, and particularly, at least one of tolylene diisocyanate, hexamethylene diisocyanate and methylene diisocyanate is preferably used. These crosslinking agents are preferably used as crosslinking agents converted into those each having a plurality of hydroxyl groups such as trimethylolpropane, or as isocyanurate type crosslinking agents in which three molecules of a diisocyanate compound are bonded to one another. The content of the crosslinking agent is preferably 10 parts to 50 parts by weight per 100 parts by weight of binder.

In order to enhance the mechanical strength of the magnetic layers, non-magnetic inorganic powders such as $\alpha$—$Al_2O_3$, $Cr_2O_3$, SiC, $TiO_2$ and $\alpha$—$Fe_2O_3$ are preferably added to the magnetic layers. Antistatic agents such as carbon black, lubricants such as aliphatic acids, aliphatic esters and silicones, dispersing agents and antifungal agents may also be added thereto as needed.

The magnetic paints for forming the magnetic layers are prepared by adding solvents to the above-mentioned compounds. There is no particular limitation on the solvents used, and at least one appropriately selected from ketone solvents such as methyl ethyl ketone, methyl isobutyl ketone and cyclohexanone and aromatic solvents such as toluene can be used.

The content of the solvent may be about 100 parts to about 900 parts by weight per 100 parts by weight of solid components (the total amount of magnetic powder, various inorganic particles and binder).

Compounded Components of Paints for Forming Backcoat Layers

The backcoat layers are provided for improving the running properties, the electric conductivity and the light shielding properties. In general, repeated running of a tape causes an increase in the friction coefficient of the tape on the surface opposite to the magnetic layer, so that the tension of the tape fluctuates in running. In this case, the tape may sometimes suffer from tape damage by contact of the tape with guides. It is therefore preferred that the backcoat layer is formed as a means for maintaining the running stability.

The backcoat layer preferably contains 40% to 80% by weight of carbon black.

Any kind of carbon black may be used as long as it is usually available, and the average particle size thereof is preferably about 10 nm to about 400 nm. For ensuring the running stability, it is preferred that the backcoat layer contains one or more kinds of carbon black. In particular, when two or more kinds of carbon black are used, it is more preferred to use carbon black different in particle size, thereby partially roughening a surface of the backcoat layer.

In order to enhance the abrasion resistance and the running stability, a non-magnetic inorganic powder or a non-magnetic organic powder, as well as carbon black, may be added to the backcoat layer. The non-magnetic inorganic powders include $\alpha$—$Al_2O_3$ (aluminum oxide), $Cr_2O_3$ (chromium oxide), $TiO_2$ (titanium oxide), SiC (silicon carbide), $MoO_2$ (molybdenum dioxide), $CaCO_3$, $\alpha$—$Fe_2O_3$, $SiO_2$ and ZnO. The non-magnetic organic powders include graphite, acrylic-styrene resins, benzoguanamine resins, melamine resins, polyolefin resins and fluororesins. The particle size thereof is preferably about 10 nm to about 1,000 nm. The content thereof is preferably 0.1 part to 20 parts by weight per 100 parts by weight of carbon black.

Binders, crosslinking agents and solvents which are used in the back coat layers can be selected from those used in the magnetic layers.

The content of the binder is preferably 15 parts to 200 parts by weight, and more preferably 50 parts to 180 parts by weight, per 100 parts by weight of the total amount of solid components (carbon black and other particles). Less than 50 parts by weight leads to shavings of a coated film to cause deterioration in running durability, whereas exceeding 180 parts by weight results in adhesion (blocking) to a surface of the magnetic layer.

The content of the crosslinking agent is preferably 10 parts to 40 parts by weight per 100 parts by weight of binder.

The content of the solvent is preferably about 300 parts to about 1200 parts by weight per 100 parts by weight of the total amount of solid components and binder.

In addition, the backcoat layers may contain lubricants such as aliphatic acids and aliphatic esters, dispersing agents, antifungal agents and various other additives as needed.

Preparation of Magnetic Paints and Backcoat Paints

Methods for preparing the magnetic paints for forming the magnetic layers and the backcoat paints for forming the backcoat layers used in the present invention are described below.

The method for preparing the magnetic paint comprises a kneading process in which cobalt-containing iron oxide and the binder are first kneaded, a dilution process in which the resulting product is diluted with the binder and the solvent, a process of stirring for mixing in which chromium dioxide is added, followed by stirring to obtain a mixture, and the solvent is added to dilute the mixture for adjustment, a dispersing process, a dilution process for viscosity adjustment, a crosslinking agent addition process and a filtration process.

Kneading Process

In the kneading process, cobalt-containing iron oxide and the binder are kneaded at a solid concentration of 65% to 85% by weight. The above-mentioned non-magnetic inorganic powder may be added thereto as needed, and the solid concentration as used in the present invention means the ratio of non-volatile components to the total materials used. A solid concentration of less than 65% by weight does not provide sufficient shearing force, so that the filling properties of the paint becomes insufficient, resulting in deterioration of the mechanical strength characteristics of the magnetic layer. A solid concentration exceeding 85% by weight generates a hard aggregate, which is not dispersed to cause clogging of a filter or an increase in drop out.

In the kneading process, chromium dioxide is not added. Chromium dioxide has a great possibility of ignition under the circumstances of high temperature or high pressure, so that it can not be added, taking into consideration the safety in the production.

Kneaders used in this process include two-roll mills, three-roll mills, high-speed mixers, open kneaders, pressure kneaders and continuous kneaders, and taking into consideration the strong kneading ability and the production efficiency, internal continuous kneaders and internal high-speed mixers which can conduct continuous treatment in the dilution process and the process of stirring for mixing are more preferably used.

Dilution Process

In the dilution process, taking into consideration the addition of chromium dioxide in the subsequent process, it is necessary to sufficiently dilute the resulting product with the binder and the solvent. The product is preferably diluted to a solid concentration of 30% to 45% by weight. A solid concentration of less than 30% by weight results in insufficient dispersion, whereas exceeding 45% by weight increases the danger of ignition after the addition of chromium dioxide in the process of stirring for mixing.

The binder and the solvent are fed into a kneader such as a continuous kneader after the above-mentioned treatment in the kneading process.

Process of Stirring for Mixing

In the process of stirring for mixing, particularly strong kneading force is not required, and a high-speed mixer suitable for stirring is preferably employed.

Chromium dioxide is fed into the high-speed mixer, and sufficient mixing is performed by stirring. Then, the solvent is added to dilute the mixture, thereby adjusting the mixture to a viscosity suitable for stirring.

The dilution is preferably adjusted so as to give a solid concentration of 35% to 50% by weight, and either a solid concentration of less than 35% by weight or exceeding 50% by weight results in insufficient dispersion.

Dispersion Process

In the dispersion process, ball mills, attriters, sand grinder mills and pin mills are used, and particularly, sand grinder mills and pin mills are preferred because of their excellent dispersing ability.

Dilution Process for Viscosity Adjustment

In the dilution process for viscosity adjustment, the solvent is added for adjusting the resulting dispersion to a paint viscosity most suitable for coating. It is preferred that the lubricant is added at this time. The addition thereof before dispersion inhibits the adsorption of the ferromagnetic powder (cobalt-containing iron oxide and chromium dioxide) and the binder, resulting in insufficient dispersion.

The backcoat paints for forming the backcoat layers are prepared by known methods using the above-mentioned binders for the backcoat layers and various additives.

Non-Magnetic Supports

Materials for the non-magnetic supports include various resins, for example, polyesters such as polyethylene terephthalate (PET) and polyethylene-2,6-naphthalate (PEN), polyolefins such as polypropylene, polyamides, polyimides and polycarbonates. Of these, PET and PEN are preferably used, because of their excellent balance between the production yield and the mechanical strength characteristics, and particularly, PEN is more preferably used.

For improving the mechanical strength characteristics (particularly, dynamic buckling strength) and head touch, it is preferred that the lateral Young's modulus (TD) of the non-magnetic support is higher than the longitudinal one (MD). The thickness of the non-magnetic support is preferably 3.0 $\mu$m to 10.0 $\mu$m.

Formation of Magnetic Layers and Backcoat Layers

The magnetic layers and the backcoat layers are formed by any of known methods such as gravure coating, reverse roll coating and extrusion coating.

As to the order of formation of the magnetic layer and the backcoat layer, the backcoat layer may be formed after formation of the magnetic layer, the magnetic layer may be formed after formation of the backcoat layer, or both may be concurrently formed.

In general, before coating of the paints, surfaces of the non-magnetic supports are often treated by various known means such as wet cleaning using water or solvents, dry cleaning using nonwoven fabrics or ultrafine fiber woven fabrics as wipers, and non-contact cleaning using compressed air, vacuum or ionized air, for cleaning and surface adjustment. Further, they are subjected to various known non-contact surface treatments such as corona discharge, ultraviolet ray irradiation and electron beam irradiation, for improving adhesion of the paints to the non-magnetic supports and improving coating surfaces, in many cases.

Further, the non-magnetic supports may be coated with undercoating agents such as aqueous undercoating agents, emulsion undercoating agents and solvent undercoating agents independently or together with the above-mentioned surface treatments for improving adhesion in some cases.

After coating of the magnetic paints, various treatments such as smoothing of wet film surfaces of the magnetic paints formed on the non-magnetic supports and coated film regulation usually may be conducted as the subsequent process. As smoothing means, known processes can be employed such as contact processes using films or bars of resins, metals or ceramics and non-contact processes using vibration caused by magnetic fields or ultrasonic waves generated with permanent magnets or electromagnets. They may be used alone or in combination depending on desired characteristics.

After coating of the magnetic paints, it is desirable that magnetic fields are allowed to act thereon to perform the magnetic field orientation treatment while they are not dried yet. The magnetic field orientation treatment is conducted for orientating the magnetic powders in the magnetic layers, and the orientation direction thereof may be longitudinal, vertical or oblique to the running direction of the magnetic recording media. Further, in order to orient the magnetic powders in the specified directions, magnetic field generating means, for example, permanent magnets such as ferrite magnets and rare earth magnets, electromagnets and solenoids are used. These magnetic field generating means may be used as a combination of a plurality of them. Further, proper drying may be conducted previously before the orientation or simultaneously therewith so that the highest orientation is obtained after drying.

Respective coated films of the magnetic layers and the backcoat layers are dried in drying furnaces after coating. They may be dried and fixed by known drying and evaporating means such as hot air, far infrared rays, electric heaters and vacuum evaporators usually mounted in drying furnaces, or known curing devices such as ultraviolet lamps and radiation irradiation devices. The drying temperature ranges from room temperature to 300° C., and may be suitably selected depending on the heat resistance of the non-magnetic supports, and the kind and the concentration of solvents. Further, the temperature gradient may be given into the drying furnaces, and the gas atmospheres in the drying furnaces may be general air or inert gases. Drying by use of ultraviolet lamps or radiation irradiation devices causes the curing reaction. Considering the after treatment, therefore, other drying means are preferably used as much as possible. Irradiation with ultraviolet rays or radiation with solvents contained is sometimes accompanied by ignition or smoking. Accordingly, also in this case, other drying means may be used in combination as much as possible.

The coated films (magnetic layers and backcoat layers) thus oriented by the magnetic fields and dried are calendered. They may be calendered either continuously by inline processing or offline processing. Further, the calendering treatment with both the magnetic layers and the backcoat layers provided is more preferred than calendering the magnetic layers and the backcoat layers separately, because development of shavings on the non-magnetic supports are prevented in calendering.

As calendering rolls, combinations of metal rolls and heat-resistant plastic rolls made of epoxy resins, polyesters, nylon, polyimides, polyamides and polyimideamides (in which inorganic compounds such as carbon and metals may be kneaded) are used. Further, combinations of metal rolls may also be used. The treating temperature is preferably 80° C. or more. The linear pressure between the rolls nipped is preferably 150 kg/cm or more, and more preferably 180 kg/cm or more. The treating speed ranges from 20 m/minute to 900 m/minute.

After such calendering treatment, the curing treatment for accelerating the curing of the magnetic layers and the backcoat layers is carried out.

The curing treatment for curing the coated films include heat curing by heating in the rolled-up state, and curing by light irradiation with ultraviolet rays or electron beams on a line prior to rolling up. The curing by heating in the rolled-up state is conducted at a temperature of 50° C. to 80° C. for 12 to 48 hours. If the temperature is set to less than 50° C., the curing of the coated films is not sufficiently accelerated. On the other hand, if the temperature exceeds 80° C., the magnetic layers and the backcoat layers are disadvantageously adhered to each other (so-called blocking) because the temperature is set to a temperature higher than the glass transition temperature of the binders or the supports constituting the media. Further, if the treating time is not adequate, the curing of the coated films is not sufficiently accelerated.

The thickness of the magnetic layers formed after coating of such magnetic paints for forming the magnetic layers is established within the range of 0.1 μm to 5 μm, and the thickness of the backcoat layers formed after coating of the paints for forming the backcoat layers is established within the range of 0.2 μm to 1.0 μm.

The present invention will be illustrated with reference to the following examples in more detail.

Preparation of Magnetic Paint for Forming Magnetic Layer

1. Kneading Process

The following composition was kneaded with a kneader for 1 hour to prepare a kneaded product.

| | |
|---|---|
| Co-Cladding $Fe_3O_4$ (specific surface area (BET value): 35.0 $m^2/g$) (average major axis: 0.30 μm) (average axial ratio: 10) | 45.0 parts by weight |
| Vinyl Chloride Resin (MR-110: manufactured by Nippon Zeon Co., Ltd.) | 2.2 parts by weight |
| Polyurethane Resin (N-2304: manufactured by Nippon Polyurethane Industry Co., Ltd.) | 2.2 parts by weight |
| Carbon Black (#3050B: manufactured by Mitsubishi Chemical Corporation) | 0.6 part by weight |
| $\alpha$-$Al_2O_3$ | 3.0 parts by weight |
| Methyl Ethyl Ketone | 7.4 parts by weight |
| Methyl Isobutyl Ketone | 3.7 parts by weight |
| Toluene | 4.0 parts by weight |
| Cyclohexanone | 2.6 parts by weight |

2. Dilution Process

The following composition was added to 70.7 parts by weight of the kneaded product for dilution.

| | |
|---|---|
| Vinyl Chloride Resin (MR-110: manufactured by Nippon Zeon Co., Ltd.) | 6.9 parts by weight |
| Polyurethane Resin (N-2304: Manufactured by Nippon Polyurethane Industry Co., Ltd.) | 6.9 parts by weight |
| Methyl Ethyl Ketone | 40.6 parts by weight |
| Methyl Isobutyl Ketone | 20.2 parts by weight |
| Toluene | 21.8 parts by weight |
| Cyclohexanone | 14.4 parts by weight |

3. Process of Stirring for Mixing

To 181.5 parts by weight of the diluted kneaded product, 55.0 parts by weight of chromium dioxide was added, followed by stirring for mixing with a high-speed agitator for 1 hour. Then, 28.3 parts by weight of solvents were added thereto for dilution.

| | |
|---|---|
| Chromium Dioxide (specific surface area (BET value): 26.0 $m^2/g$) (average major axis: 0.40 μm) (average axial ratio: 12) | 55.0 parts by weight |
| Methyl Ethyl Ketone | 11.9 parts by weight |
| Methyl Isobutyl Ketone | 5.9 parts by weight |
| Toluene | 6.2 parts by weight |
| Cyclohexanone | 4.3 parts by weight |

4. Dispersion Process

After stirring for mixing, the paint was dispersed in a sand grind mill for 6 hours.

5. Dilution Process for Adjusting Viscosity

After dispersion, the following composition was added to 264.8 parts by weight of the paint for dilution.

| | |
|---|---|
| Stearic Acid | 0.65 part by weight |
| Myristic Acid | 0.65 part by weight |
| Butyl Stearate | 0.8 part by weight |
| Methyl Ethyl Ketone | 24.9 parts by weight |
| Methyl Isobutyl Ketone | 12.4 parts by weight |
| Toluene | 13.0 parts by weight |
| Cyclohexanone | 8.9 parts by weight |

6. Process of Adding Crosslinking Agent

After adjusting the viscosity, 9.1 parts by weight of a polyisocyanate (Coronate L: manufactured by Nippon Polyurethane Industry Co., Ltd.) was added to 326.1 parts by weight of the paint to prepare a magnetic paint for forming a magnetic layer.

Preparation of Paint for Backcoat Layer

| | |
|---|---|
| Carbon Black A (particle size: 23 nm, BET value: 130 m$^2$/g, DBP oil absorption: 64 cc/100 g) | 100 parts by weight |
| Carbon Black B (particle size: 350 nm, BET value: 5 m$^2$/g, DBP oil absorption: 30 cc/100 g) | 1.2 parts by weight |
| Carbon Graphite (particle size: 40 nm, BET value: 50 m$^2$/g, DBP oil absorption: 180 cc/100 g) | 3 parts by weight |
| Vinyl Chloride Resin | 50 parts by weight |
| Polyurethane Resin (N-2304: manufactured by Nippon Polyurethane Industry Co., Ltd.) | 50 parts by weight |
| α-Fe$_2$O$_3$ (TF-100: manufactured by Toda Kogyo Corp.) | 1 part by weight |
| Myristic Acid | 1.5 parts by weight |
| Stearic Acid | 1.5 parts by weight |
| Butyl Stearate | 1 part by weight |
| Methyl Ethyl Ketone | 550 parts by weight |
| Methyl Isobutyl Ketone | 150 parts by weight |
| Toluene | 600 parts by weight |
| Cyclohexanone | 200 parts by weight |

Such a paint for forming a back coat layer was sufficiently kneaded with a pressure kneader, dispersed with a sand grinder mill, and then diluted with solvents. Thereafter, 15 parts by weight of the polyisocyanate (Coronate L: manufactured by Nippon Polyurethane Industry Co., Ltd.) was added thereto for adjustment, thus preparing the paint for forming the back coat layer.

Non-magnetic Support

Polyethylene-2,6-naphthalate (PEN) 9.1 μm in thickness
Young's Modulus: MD=500 kg/mm$^2$, TD=1400 kg/mm$^2$ Preparation of Magnetic Recording Medium A surface on the magnetic layer-forming side of a 9.1-μm thick polyethylene-2,6-naphthalate (PEN) support was submitted to corona discharge. Then, a surface opposite to the surface submitted to corona discharge was coated with the above-mentioned backcoat paint for forming the backcoat layer by use of a gravure cylinder, followed by drying, thus forming the backcoat layer. Thereafter, the other surface was coated with the magnetic paint for forming the magnetic layer by use of a gravure cylinder, and the paint was dried while orienting the magnetic powder in the running direction of the magnetic recording medium (applying a magnetic field of 4000 G in the running direction) in its wet state, thereby forming the magnetic layer. Then, surfaces of both layers were calendered, and the support having respective coated films was once rolled up. After standing at room temperature for 1 hour, heat curing was conducted at 60° C. for 24 hours. Then, the magnetic recording medium having a width of ½ inch was prepared by the slitting treatment. The thickness of the magnetic layer was 2.5 μm, and that of the backcoat layer was 0.8 μm.

EXAMPLE 1

A magnetic paint for forming a magnetic layer comprising cobalt-containing iron oxide and chromium dioxide at a weight ratio (wt %) of 45:55 was prepared in the following manner.

First, cobalt-containing iron oxide and the binders were kneaded at a solid concentration (NV value) of 75% by weight in a kneader (kneading process), and diluted with the binders and the solvents (dilution process). Then, chromium dioxide was added thereto, followed by stirring for mixing by use of a high-speed agitator (process of stirring for mixing). The resulting mixture was further dispersed and diluted for viscosity adjustment. Then, the crosslinking agent was added thereto, thus preparing the magnetic paint. Using the above-mentioned paint for the backcoat layer and non-magnetic support (thickness: 9.1 μm, material: polyethylene-2,6-naphthalate, lateral Young's modulus (TD): 1400 kg/mm$^2$, longitudinal Young's modulus (MD): 500 kg/mm$^2$), a magnetic recording medium sample of Example 1 was prepared as described above.

EXAMPLES 2 TO 5 AND COMPARATIVE EXAMPLES 1 AND 2

Samples of Examples 2 to 5 and Comparative Examples 1 and 2 were prepared in the same manner as with Example 1 with the exception that the weight ratio (wt %) of cobalt-containing iron oxide to chromium oxide was changed to 70:30, 62:38, 48:52, 40:60, 75:25 and 35:65, respectively, and the amounts of the binders and the solvents were adjusted in each process according to changes in the weight ratio of cobalt-containing iron oxide to chromium oxide.

EXAMPLES 6 TO 9 AND COMPARATIVE EXAMPLES 3 AND 4

Samples of Examples 6 to 9 and Comparative Examples 3 and 4 were prepared in the same manner as with Example 1 with the exception that the solid concentration (NV value) in the kneading process was changed to 85, 80, 70, 65, 90 and 60, respectively, and the amounts of the binders and the solvents were adjusted in each process according to changes in the solid concentration.

COMPARATIVE EXAMPLE 5

In Example 1, chromium dioxide was kneaded in the kneading process. As a result, the generation of fumes was observed in kneading, so that the preparation of the sample was stopped because of danger.

COMPARATIVE EXAMPLE 6

In Example 1, cobalt-containing iron oxide was mixed with chromium dioxide, and the mixture was kneaded. As a result, the generation of fumes was observed in kneading, so that the preparation of the sample was stopped because of danger.

COMPARATIVE EXAMPLE 7

A sample of Comparative Example 7 was prepared in the same manner as with Example 1 with the exception that a magnetic paint for forming a magnetic layer was prepared by dispersing the mixture after the process of stirring for mixing without the kneading process and the dilution process, wherein cobalt-containing iron oxide and chromium dioxide were used in the process of stirring for mixing, and the amounts of the binders and the solvents were adjusted in each process.

COMPARATIVE EXAMPLE 8

A sample of Comparative Example 8 was prepared in the same manner as with Example 1 with the exception that the backcoat layer was not formed and the thickness of the magnetic layer was adjusted to 3.3 μm to make the total thickness of the sample equal to that of Example 1.

Measurement and Evaluation

Dynamic Buckling Strength (Mechanical Strength Characteristic)

Measuring Device

VG-5, a device for measuring dynamic buckling strength, manufactured by Victor Co. of Japan Ltd.

Measuring Conditions

Tape feed speed: 3.335 cm/sec

Back tension: 40 g

The lateral strength of each of the magnetic recording media (VHS-C tapes for 40 minutes) of Examples and Comparative Examples was measured by use of the above-mentioned measuring device under the above-mentioned measuring conditions.

Tape Damage (Mechanical Strength Characteristic)

Using an HV-F220 video deck, a VTR manufactured by Mitsubishi Electric Corp., a VC-HF430 video deck, a VTR manufactured by Sharp Corp. and an NV-SX50W video deck, a VTR manufactured by Matsushita Electric Industrial Co. Ltd., the magnetic recording media (VHS-C tapes for 40 minutes) of Examples and Comparative Examples were allowed to run 500 passes under conditions of 20° C. and 60% RH. The tape damage of each sample after running was visually observed, and evaluated by four stages based on the following criterion.

⊚: No tape damage is observed at all.

○: The tape damage is slight, but there is no actual damage on a picture.

Δ: The tape damage is considerable, and there is trouble on a picture.

×: The tape damage is serious, or there is trouble in running (interruption of running).

Head Abrasion Loss

Using an SR-375 video deck, a VTR manufactured by JVC Co., the magnetic recording media (VHS tapes for 210 minutes) of Examples and Comparative Examples were allowed to run for 100 hours under conditions of 20° C. and 60% RH. The abrasion loss of a magnetic head of the video deck after running (a projected amount of the head before use—a projected amount of the head after use) was measured with a KY-90 type micron depth-height gauge manufactured by Nissho Seimitsu Kogaku Co. for each magnetic recording medium.

The standard shall be 6 $\mu$m or less.

Durable Friction Coefficient

Measuring Device

Shoeshine friction measuring device manufactured by Yokohama Sokuteiki Co.

Measuring Conditions

Tape running speed: 3.335 cm/sec

Winding angle on a running surface: 180° (a surface of a backcoat layer)

Number of times of repeated running: 100 times

The durable friction coefficient ($\mu$) is calculated by the following equation:

$$\text{Durable friction coefficient } (\mu) = (1/\theta) \log (X/X_0)$$

wherein $\theta = \pi(\text{rad})$, $X_0$ is a measured value under a load of 40 g, and X is a measured value after running was repeated 100 times.

The initial value and the measured value after running was repeated 100 times were determined by the above-mentioned method for each magnetic recording medium.

DO

Measuring Device

BR-7000A, a VTR manufactured by JVC Co.

VHO1BZ, a dropout counter manufactured by Shibasoku Co.

Measuring Conditions

Input signal: 50% white signal

Width: 15 $\mu$sec

Depth: 16 dB

Measuring time: 40 minutes

Using the above-mentioned devices under the above-mentioned conditions, the number of dropouts per minute was measured.

The standard shall be 35 dropouts/minute or less.

Electromagnetic Characteristic (Y-S/N)

Using an UPSF2 noise meter manufactured by Rhode and Schwarz Co. and a BR-7000A VTR manufactured by Victor Co. of Japan Ltd., a 50% white signal was recorded and reproduced. The difference from a standard VHS tape was measured and represented by dB.

Overall Evaluation

Each magnetic recording medium sample was evaluated by three stages based on the following criterion.

○: The production standard is satisfied, and there is no problem at all.

Δ: The production standard is satisfied, and there is practically no problem.

×: The production standard is not satisfied, or there is a problem.

According to the present invention, the magnetic recording media can be produced which can prevent an increase in head abrasion loss, have no problem and are safe with respect to their production, and have very excellent mechanical strength characteristics (dynamic buckling strength and tape damage).

TABLE 1

| | ferromagnetic powders $CrO_2$:Co—$Fe_3O_4$ [wt % ratio] | NV value at mixing [wt %] | method of preparing a paint | B.C. | danger at kneading | Dynamic Buckling Strength [g] | tape damage | head abrasion loss [$\mu$m] | Durable friction Coefficient at BC side 0→100 runs | D.O. [numbers/min] | Electro-magnetics Y-S/N [dB] | Total evaluation |
|---|---|---|---|---|---|---|---|---|---|---|---|---|
| Example ① | 55:45 | 75 | Co—$Fe_3O_4$→+$CrO_2$ | yes | no | 72.4 | ○ | 4.5 | 0.15→0.16 | 6 | +2.5 | ○ |
| Example ② | 70:30 | 75 | Co—$Fe_3O_4$→+$CrO_2$ | yes | no | 75.0 | ⊚ | 5.8 | 0.15→0.16 | 8 | +2.2 | ○ |
| Example ③ | 62:38 | 75 | Co—$Fe_3O_4$→+$CrO_2$ | yes | no | 73.8 | ⊚ | 5.0 | 0.15→0.16 | 7 | +2.4 | ○ |

TABLE 1-continued

| | ferromagnetic powders $CrO_2$:Co—$Fe_3O_4$ [wt % ratio] | NV value at mixing [wt %] | method of preparing a paint | B.C. | danger at kneading | Dynamic Buckling Strength [g] | tape damage | head abrasion loss [μm] | Durable friction Coefficient at BC side 0→100 runs | D.O. [numbers/min] | Electromagnetics Y-S/N [dB] | Total evaluation |
|---|---|---|---|---|---|---|---|---|---|---|---|---|
| Example ④ | 48:52 | 75 | Co—$Fe_3O_4$→+$CrO_2$ | yes | no | 71.5 | ○ | 4.2 | 0.15→0.16 | 7 | +2.6 | ○ |
| Example ⑤ | 40:60 | 75 | Co—$Fe_3O_4$→+$CrO_2$ | yes | no | 70.0 | ○ | 4.1 | 0.15→0.16 | 5 | +2.7 | Δ |
| R. Ex. ① | 75:25 | 75 | Co—$Fe_3O_4$→+$CrO_2$ | yes | no | 75.6 | ⊚ | 7.0 | 0.15→0.16 | 8 | +2.1 | x |
| R. Ex. ② | 35:65 | 75 | Co—$Fe_3O_4$→+$CrO_2$ | yes | no | 69.3 | Δ | 3.9 | 0.15→0.16 | 7 | +2.8 | x |
| Example ⑥ | 55:45 | 85 | Co—$Fe_3O_4$→+$CrO_2$ | yes | no | 72.8 | ○ | 4.6 | 0.15→0.16 | 15 | +2.6 | ○ |
| Example ⑦ | 55:45 | 80 | Co—$Fe_3O_4$→+$CrO_2$ | yes | no | 72.7 | ○ | 4.5 | 0.15→0.16 | 9 | +2.5 | ○ |
| Example ⑧ | 55:45 | 65 | Co—$Fe_3O_4$→+$CrO_2$ | yes | no | 72.1 | ○ | 5.1 | 0.15→0.16 | 7 | +2.4 | ○ |
| Example ⑨ | 55:45 | 65 | Co—$Fe_3O_4$→+$CrO_2$ | yes | no | 71.1 | ○ | 5.1 | 0.15→0.16 | 6 | +2.4 | Δ |
| R. Ex. ③ | 55:45 | 90 | Co—$Fe_3O_4$→+$CrO_2$ | yes | no | 72.9 | ○ | 5.1 | 0.15→0.16 | 36 | +2.6 | x |
| R. Ex. ④ | 55:45 | 60 | Co—$Fe_3O_4$→+$CrO_2$ | yes | no | 69.5 | Δ | 5.8 | 0.15→0.16 | 8 | +2.3 | x |
| R. Ex. ⑤ | 55:45 | 75 | $CrO_2$→+Co—$Fe_3O_4$ | yes | ignitable | | | cannot get a sample | | | | x |
| R. Ex. ⑥ | 55:45 | 75 | (Co—$Fe_3O_4$+$CrO_2$) kneading | yes | ignitable | | | cannot get a sample | | | | x |
| R. Ex. ⑦ | 55:45 | — | (Co—$Fe_3O_4$+$CrO_2$) mixing | yes | no | 68.0 | Δ | 6.6 | 0.15→0.16 | 8 | +1.2 | x |
| R. Ex. ⑧ | 55:45 | 75 | Co—$Fe_3O_4$→+$CrO_2$ | no | no | 74.6 | x | ☆ | 0.23→0.68 | 41 | °2.5 | x |

R. Ex.: Reference Example
Co—$Fe_3O_4$→+$CrO_2$: kneading Co-containing iron oxide and binder, then adding chromium dioxide thereto and mixing
$CrO_2$→+Co—$Fe_3O_4$: kneading of chromium dioxide and binder, then adding Co-containing iron oxide thereto and mixing
☆: unmeasurable

What is claimed is:

1. A method for producing a magnetic recording medium wherein a backcoat layer is provided on one surface of a non-magnetic support and a magnetic layer formed of a paint is provided on the other surface of the support, the magnetic layer being mainly composed of a ferromagnetic powder and a binder, said ferromagnetic powder comprising chromium dioxide and cobalt-containing iron oxide within the weight ratio (wt %) range of 40:60 to 70:30, the set of providing said magnetic layer includes preparing said paint by a process comprising kneading cobalt-containing iron oxide and the binder at a solid concentration of 65% to 85% by weight, subsequently diluting the resulting product with the binder and a solvent, then, adding chromium dioxide thereto, followed by stirring to obtain a mixture, and subjecting the mixture to dispersion.

2. A method as defined in claim 1, further including adding a crosslinking agent to the dispersed mixture.

* * * * *

UNITED STATES PATENT AND TRADEMARK OFFICE
CERTIFICATE OF CORRECTION

PATENT NO.     : 6,126,990
DATED          : October 3, 2000
INVENTOR(S)    : Kiyonori Hinoki et al.

It is certified that error appears in the above-identified patent and that said Letters Patent is hereby corrected as shown below:

<u>Title page,</u>
Item [30], Foreign Application Priority Data, should read as follows:

-- [30] Foreign Application Priority Data
Mar. 31, 1997   [JP]     Japan ……………….. 9-079433 --

Signed and Sealed this

Thirteenth Day of May, 2003

JAMES E. ROGAN
*Director of the United States Patent and Trademark Office*